Feb. 13, 1962   R. D. CORNELIUS   3,021,170
TELESCOPING COVER FOR TRUCKS
Filed Sept. 3, 1958   3 Sheets-Sheet 1
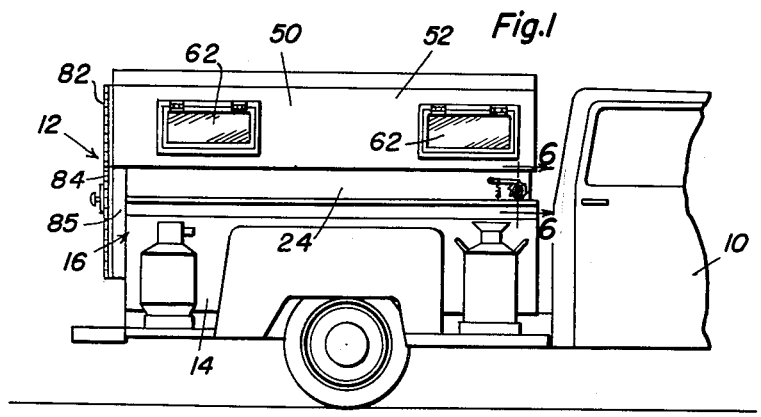
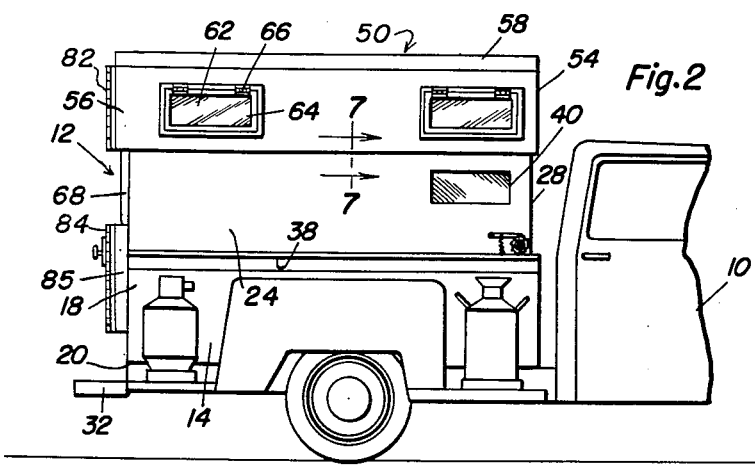
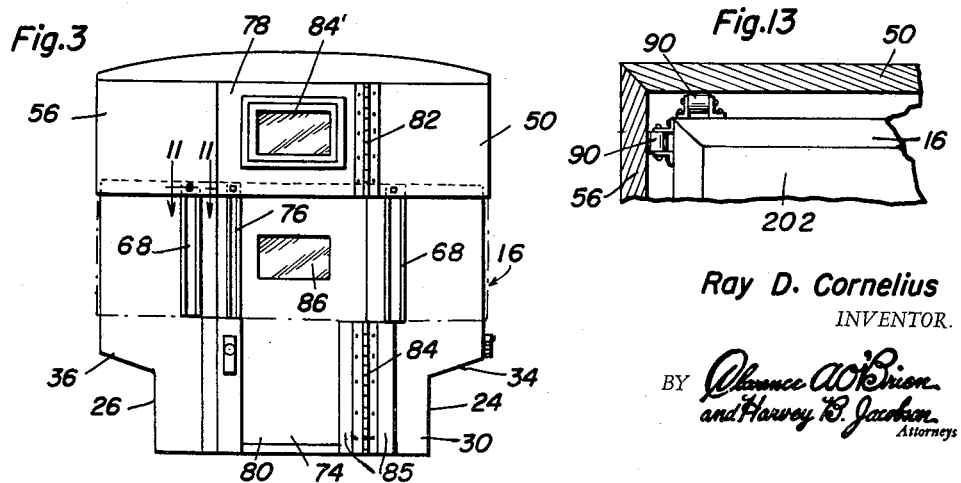
Ray D. Cornelius
INVENTOR.

Feb. 13, 1962
R. D. CORNELIUS
3,021,170
TELESCOPING COVER FOR TRUCKS
Filed Sept. 3, 1958
3 Sheets-Sheet 2
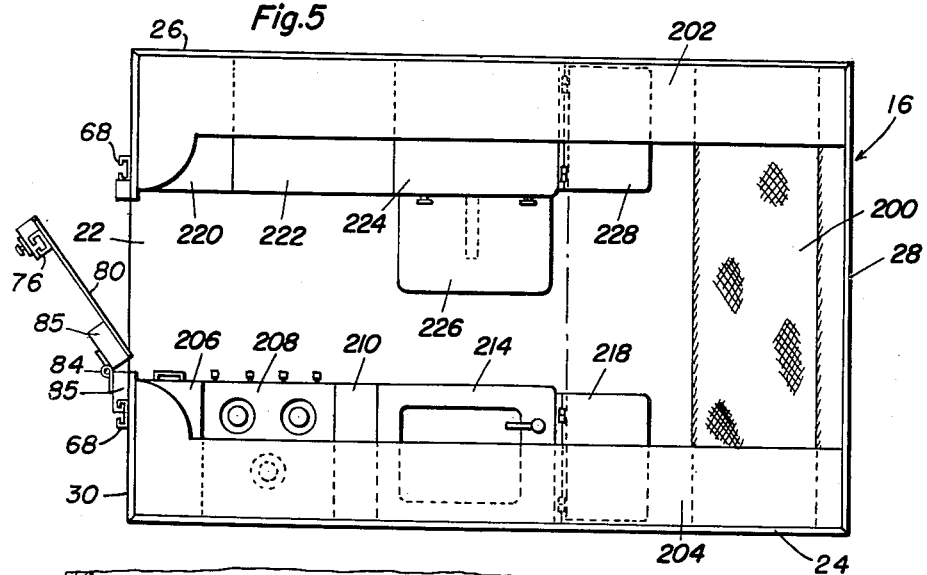
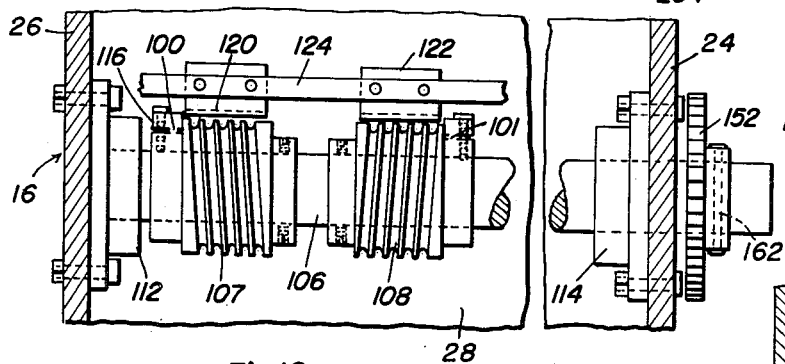
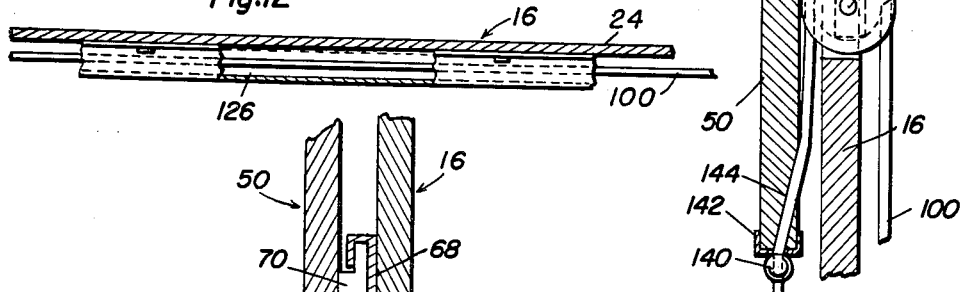
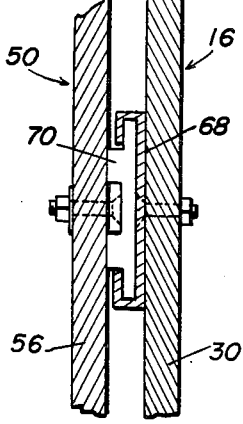
Ray D. Cornelius
INVENTOR.
BY Clarence A. O'Brien
and Harvey B. Jacobson
Attorneys

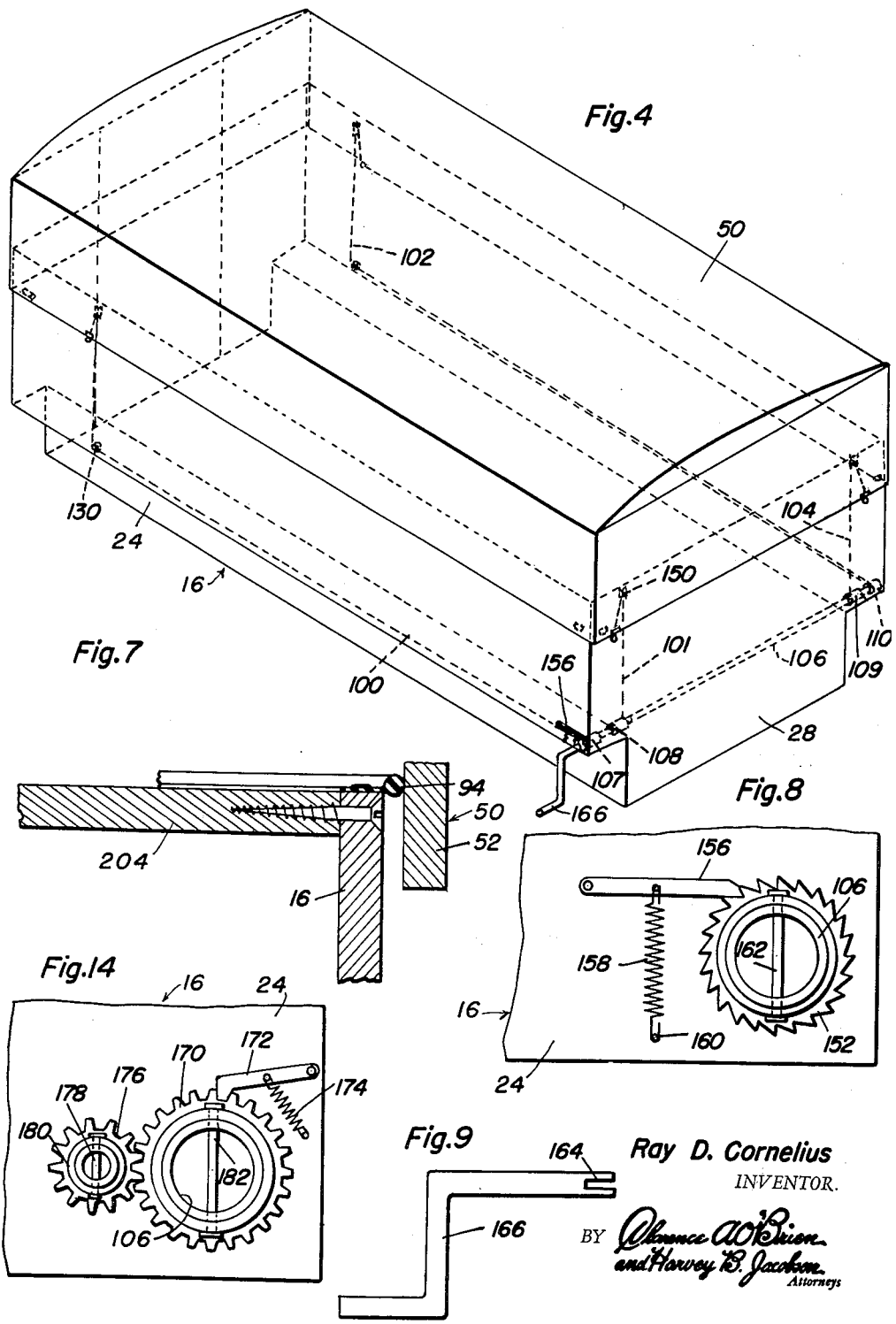

tes Patent Office 3,021,170
Patented Feb. 13, 1962

3,021,170
TELESCOPING COVER FOR TRUCKS
Ray D. Cornelius, 80 Galway Court, Eugene, Oreg.
Filed Sept. 3, 1958, Ser. No. 758,739
1 Claim. (Cl. 296—23)

This invention relates to motor vehicles and more particularly to a telescoping cover or cabin to convert a pickup truck to a mobile house.

An object of the invention is to provide a practical, simple and compact unit for installation on the body of an ordinary conventional pickup truck whereby the pickup truck is converted to a mobile house that is superior to others of the same general class.

Another object of the invention is to provide a canopy for a truck, especially a pickup truck, the canopy being adjustable so that the upper section is telescoped over the lower section whereby the canopy may be raised for living in it, that is, for camping trips, fishing trips, etc. or lowered to facilitate mobility and to improve the appearance thereof.

Although the invention is capable of being practiced with trucks that are to be converted to permanent or temporary dwellings, the invention has wide application in connection with camping trips or other vacations involving visiting places at which accommodations do not exist and if they are present, are not wanted.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side view of a part of a truck equipped with a canopy constructed in accordance with the invention.

FIGURE 2 is an elevational side view similar to FIGURE 1 but showing the canopy in the extended position.

FIGURE 3 is a rear view of the canopy in FIGURE 2.

FIGURE 4 is a diagrammatic perspective view showing principally the means for raising and lowering the upper section of the canopy with respect to the lower section thereof.

FIGURE 5 is a diagrammatic top view showing a suggested floor plan and equipment in the canopy.

FIGURE 6 is an enlarged sectional view taken on the line 6—6 of FIGURE 1.

FIGURE 7 is an enlarged sectional view taken on the line 7—7 of FIGURE 2 and showing the weather seal between sections.

FIGURE 8 is a fragmentary enlarged elevational view of the means for locking the upper section in a selected elevated position with respect to the lower section of the canopy.

FIGURE 9 is an elevational view of a handcrank used to raise the upper section.

FIGURE 10 is an enlarged sectional view showing a typical pulley and cable assembly between the upper and lower sections of the canopy.

FIGURE 11 is an enlarged sectional view taken on the line 11—11 of FIGURE 3.

FIGURE 12 is an enlarged fragmentary sectional view showing a cable guide to constrain the movements of the cables which are used for elevating the upper section of the canopy.

FIGURE 13 is a fragmentary detail sectional view showing rollers to facilitate the sliding of the upper section on the lower section of the canopy.

FIGURE 14 is an elevational view showing a modification of the means for raising the upper section of the canopy with respect to the lower section.

In the accompanying drawings there is a conventional pickup truck 10 which represents one and the preferred type of motor vehicle on which the canopy or cover 12 is installed to convert the pickup truck to a mobile house. The mobile house may be used for not only the purposes mentioned previously but any others including pleasure, industrial, commercial, etc. The pickup truck has its body 14 used as the foundation for lower section 16 of canopy or cover 12. The pickup truck body has sides 18 and a bottom 20. The lower section 16 is shaped to conform to the truck body 14 and therefore, it has a floor 22 which seats on the bottom 20 of the truck body, together with two sides 24 and 26 which fit flush against the inside surfaces of the sides 18 of the truck body. Inner end wall 28 fits against the inside surface of the front end wall of the truck body, and the rear wall 30 of lower section 16 extends across the space formerly occupied by the tailgate of the truck. A step 32 is attached to the truck body beneath wall 30 of lower section 16.

Sides 24 and 26 are short and have lateral panels 34 and 36 at their upper edges to seat upon the lateral parts 38 of the sides 18 of the truck body. The upper parts of the sides 24 and 26 rise vertically from the lateral panels 34 and 36, and there are one or more windows, for instance window 40 in the uper parts of the sides of the lower section 16.

The upper section 50 of canopy or cover 16 has two sides 52, a front wall 54 and a rear wall 56. Roof 58 is attached to the four walls of the upper section, and the size of the upper section is such that it is telescoped over the upper portion of the lower section. A plurality of windows, for instance windows 62 are in the sides of the upper section, and these windows are adapted to swing outwardly. They, for example, may be constructed of a window panel 64 connected by hinges 66 to a window frame and have any other necessary hardware to hold them in a selected open position. The windows in the upper section are at least in part adapted to register with the windows in the lower section when the upper section is in the lowered position (FIG. 1). In this way light will enter the canopy regardless of whether it is in the raised or lowered position.

The rear walls 30 and 56 of the two sections are specially constructed. There is means for constraining the movement of the upper section with respect to the lower section. This means comprises a pair of channels 68 (FIG. 11) bolted or otherwise attached to the outside surface of wall 30. The channels 68 are dovetailed with rails 70 that are bolted or otherwise secured to rear wall 56 of the upper section 50 on opposite sides of door 74. An additional similar channel and rail assembly 76 is operatively connected between the upper part 78 and the lower part 80 of door 74. The rail of the assembly 76 is mounted on the inner side of the door part 78. The door is made in two parts, one connected by hinge 82 in wall 56 and the other connected by hinge 84 to wall 30. The hinge 84 is mounted on vertical spacers or cleats 85 for vertically aligning the pintle of said hinge with the pintle of the upper hinge 82. The doors are coupled together by channel and rail assembly 76 so that the doors open in unison regardless of whether the sections of the canopy are raised or lowered. Window 84' is in the upper part 78 of the door and is adapted to register with window 86 in the lower part of the door when the canopy is in the lowered position (FIG. 1). Other door hardware such as a lock and latch, is operatively connected with the door. In use of the door, it is simply opened and closed just as any other door. However, both sections of the door operate simultaneously regardless of the position of the sections of the canopy.

There is means for raising and lowering the sections. In the movements of the sections, the channels and rails (FIG. 3) at least partially constrain the movement of the upper section with respect to the lower section. In furtherance of this purpose there are rollers 90 attached to the outside surfaces of the walls of the lower section and in contact with the inside surfaces of the walls of the upper section (FIG. 13) and located at the corners of the sections. Moreover, an effective and tight weather seal is achieved by weather-stripping 94 attached to the lower section and in contact with the inside surfaces of the side walls of the upper section (FIG. 7). The weather-stripping may vary in its actual construction, although beaded rubber or plastic stripping is suggested because of its economy and the fact that it performs the intended purpose very adequately, sealing out dust, dirt, moisture, etc.

There are four prestressed cables 100, 101, 102 and 104 that are used for raising the upper section of the canopy and for holding it in the elevated position. The upper section of the canopy is lowered by gravity. A single transverse shaft 106 extends across the rear part of the lower section and has four grooved winding drums 107, 108, 109 and 110 attached to it. One end of shaft 106 is mounted for rotation in bearing 112 (FIG. 6) which is bolted or otherwise fastened to one side of the lower section of the canopy. Bearing 114 is attached to the other side of the lower section of the canopy and has one end of shaft 106 projecting through it. The four winding drums are fastened to the shaft 106 in pairs with one pair having drums 107 and 108 at one end of the shaft and the other pair having winding drums 109 and 110 near the other end of the shaft. Both pairs of cables and both pairs of winding drums are identical and therefore FIGURE 6 shows only one pair of winding drums in detail. The cable 100 is attached to drum 107 by being held between the jaws of hold down clamp 116 on the winding drum 107. One jaw is movable with respect to the other by bolting it tight on the body of the winding drum. The cable 100 is entrained around the drum by fitting in the grooves thereof, and the cable cannot escape from these grooves because of cable guide 120. The cable guide 120 has a counterpart 122 for winding drum 108 to which cable 101 is connected. The cable guides each consist of small angle brackets mounted in place on support 124 that is anchored adjacent to shaft 106. The cable 100 extends through cable guide 126 (FIG. 12) consisting of a conduit, channel or any other structural guide capable of holding a cable captive therein but enabling the cable to slide longitudinally therethrough. The cable guide prevents the cable from becoming tangled, loose or interfered with. The guide 126 is used throughout where necessary or desirable.

As cable 100 extends from drum 107 (FIG. 4) it travels longitudinally of the lower section of the canopy and is entrained over pulley 130 mounted for rotation in the lower section. It then extends upward and is entrained over pulley 132 (FIG. 10) which is also attached to the lower section of the canopy. The pulley 122 is mounted on a spindle 134, and this is maintained in place by a hanger or a bracket that is inset in recess 138 in the side wall of the lower section. Cable 100 then extends downward and is attached to the side wall of the upper section by any suitable means but preferably by having a ball 140 squeezed onto the cable and in engagement with a lower edge reinforcing channel 142 that is attached to the side walls of the upper section of the canopy. In order to make the connection of cable 100 with the wall of the upper section, a passageway 144 is drilled at an angle through the lower part of the wall of the upper section.

Cable 101 is attached to drum 108 and extends more directly between the lower and upper sections of the canopy. The cable 101 extends over upper pulley 150 that is attached to the rear wall 30 and then extends downward to be anchored to the rear wall 56 of the upper section of the canopy. Cables 102 and 104 are attached to winding drums 109 and 110 and extend over and are guided by pulleys in the same manner as the cables 101 and 100. All winding drums and therefore all cables operate in unison since the winding drums are attached to the same shaft 106.

There is means for locking the shaft and hence the cables and upper section, in a selected position. This means comprises a ratchet wheel 152 which is secured to shaft 106, together with a dog 156 which is engageable with the teeth of the ratchet wheel (FIG. 8). The dog is biased by spring 158 that is attached to dog 156 and to a pin 160 on the lower section of the canopy. Transverse crankpin 162 is attached across a hollow end of shaft 106 and is engaged by the bifurcated end 164 of crank 156. The crank is used to manually operate shaft 106 and thereby elevate the upper section of the canopy with respect to the lower section thereof.

In order to obtain additional power for operating the upper section of the canopy, the modification of FIGURE 14 may be adopted. Here there is illustrated a gear 170. The gear 170 is engaged by dog 172 that is pressed by spring 174 attached to the dog and to a wall of the lower section, into engagement between the teeth of gear 170. Pinion 176 is attached to freely rotating pinion shaft 180. The pinion shaft is mounted in a bearing in the side wall of the lower section of the canopy adjacent to gear 170. The teeth of the pinion are enmeshed with the teeth of the gear 170. A transverse crankpin 178 extends across and is secured to the hollow end of the pinion shaft 180 so that the crank may be fitted therewith for rotating the shaft to which gear 170 is attached. Alternatively, the crankpin 182 which is identical in construction and function to crankpin 178 may be used for direct winding of the shaft 106.

The floor plan of the mobile house built onto the pickup truck, may be varied. However there is a suggested floor plan shown in FIGURE 5. A davenport 200 extends transversely across the forward part of the canopy and is located below two long, copious shelves 202 and 204 that extend longitudinally of the lower section of the canopy and at the upper part of this lower section. Along one side wall of the lower section there is a cabinet 206 for storage adjacent to stove 208. Tray, shelves and other storage 210 are adjacent to stove and to sink 214. A drop leaf table 218 is hinged alongside of sink 214 and is adapted to be lowered when the davenport is opened to a double bed. Along the other side wall of the lower section there is a cabinet 220, a closet 222, a storage cabinet 224 and a drop leaf table 226 at the front of the storage cabinet 224. These cabinets may be open front or closed with doors, and considerable variation and leeway is permissible for the rearrangement of furnishing. Finally, drop leaf table 228 which is the same as the drop leaf table 218, is at the end of the storage cabinet 224 and must be lowered to permit the davenport to open to a double bed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A cabin to be removably mounted on a truck body, said cabin comprising side walls, a front wall and a rear wall having an opening therein, said cabin further comprising a lower section and an upper section mounted telescopically for vertical sliding adjustment thereon, and a door for the opening, said door including upper and lower parts, vertically aligned hinges mounting said door parts on the upper and lower cabin sections, respectively, and means connecting the door parts for operation in unison in all adjusted positions of the upper cabin section.

References Cited in the file of this patent

UNITED STATES PATENTS

| | | |
|---|---|---|
| 1,085,803 | Drover | Feb. 3, 1914 |
| 2,292,107 | Doepke | Aug. 4, 1942 |
| 2,343,261 | Marple | Mar. 7, 1944 |
| 2,385,169 | Stone | Sept. 18, 1945 |
| 2,443,516 | Rockwell | June 15, 1948 |
| 2,569,641 | Metherell | Oct. 2, 1951 |
| 2,690,351 | Giles | Sept. 28, 1954 |
| 2,818,748 | Lawson et al. | Jan. 7, 1958 |
| 2,862,759 | Huth | Dec. 2, 1958 |
| 2,879,103 | Hall | Mar. 24, 1959 |

FOREIGN PATENTS

| | | |
|---|---|---|
| 106,933 | Australia | Mar. 14, 1939 |
| 570,020 | France | Jan. 12, 1924 |
| 271,388 | Great Britain | May 26, 1927 |
| 445,040 | Great Britain | Apr. 2, 1936 |